United States Patent Office 3,137,635
Patented June 16, 1964

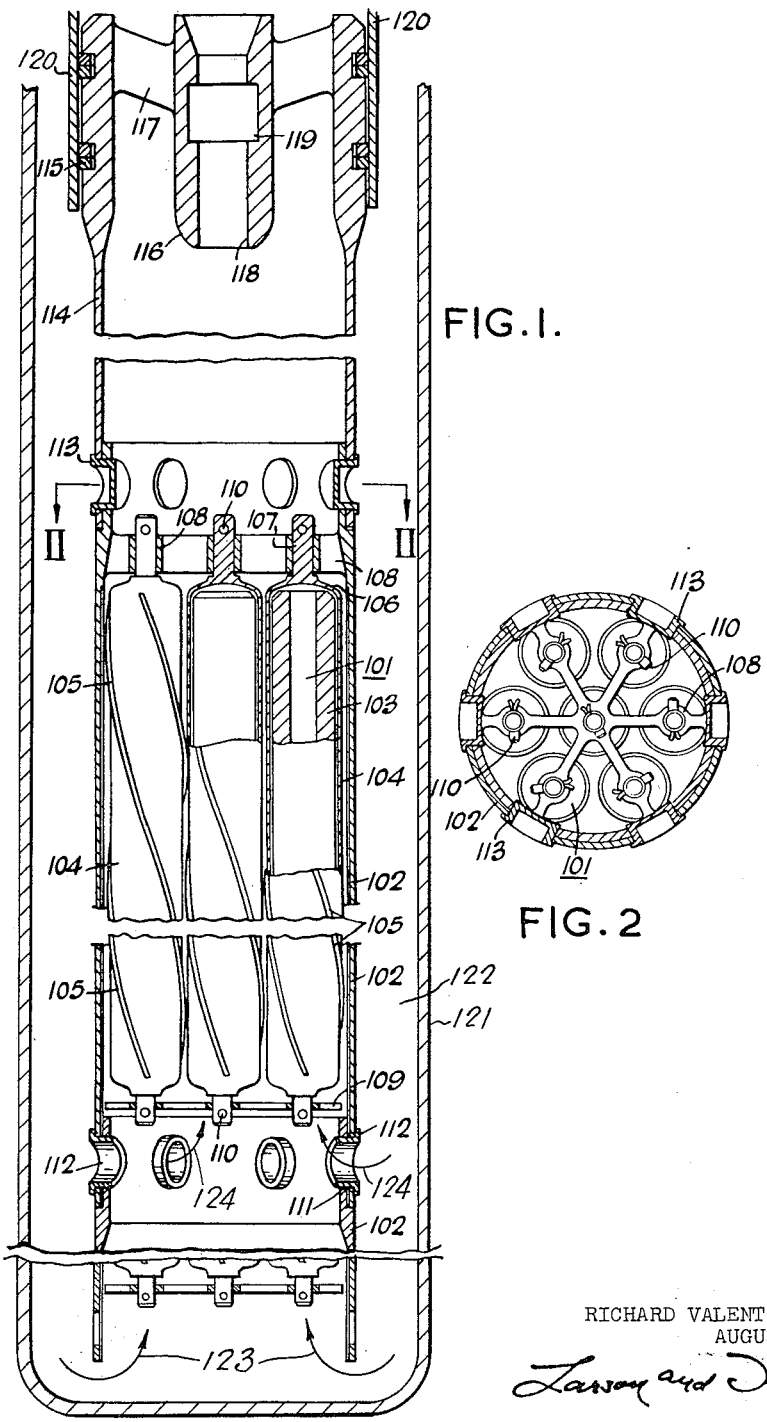

3,137,635
FUEL ELEMENTS FOR NUCLEAR REACTORS
Richard Valentine Moore, Appleton, and August Roumph, Culcheth, near Warrington, England, assignors to the United Kingdom Atomic Energy Authority, London, England
Filed June 24, 1958, Ser. No. 744,184
Claims priority, application Great Britain June 24, 1957
2 Claims. (Cl. 176—43)

This invention relates to nuclear reactors and has an application in the sodium graphite reactor disclosed in detail in copending application Serial No. 744,185 of even date, filed in the names of Long and Challender, now U.S. Patent No. 3,000,728.

In one cooling system, sometimes referred to as the "re-entrant" system, for nuclear reactors using solid nuclear fuel, the coolant channels are constructed from thimble-shaped tubes divided by a sleeve into inner channels which are inside the sleeve and outer annular spaces between the sleeve and the thimble tube. The fuel elements are located inside the sleeve and the coolant is arranged to flow first along the outer annular spaces and then over the fuel elements in the inner channels, ensuring that the higher coolant temperatures are reached where the coolant is in contact only with components which can be readily discharged from the reactor should the hot coolant corrode them. With such a cooling system the fuel element and sleeve extend as one unit almost the full length of each fuel element channel in the reactor core and the life of the whole unit will expire when any portion of the fuel has received the maximum appropriate irradiation. The position of greatest neutron flux in a fuel element channel is normally at or near its centre and hence the irradiation of the centre portion determines the life of the unit. As the ends of the unit have not been subjected to such intense radiation as the centre, however, the mean irradiation of the fuel is lower than that which the element could sustain if it had been irradiated uniformly and it is an object of the present invention to provide a fuel element assembly in which the fuel can be subjected to a higher mean irradiation.

According to the present invention a fuel element assembly for a nuclear reactor having a re-entrant system of cooling comprises a stack of sleeves each supporting separate portions of nuclear fuel so that the stack of sleeves may be dismantled and reassembled in a different order without removing the nuclear fuel.

The arrangement of the present invention provides a fuel element assembly which may be divided up and reassembled so that by withdrawing the assembly from the core and inter-changing the positions of the top and bottom halves without changing their orientation the lesser irradiated ends of the old assembly become joined to form a centre portion capable of sustaining further irradiation in the centre of the reactor and the greater irradiated centre of the old assembly forms the ends of the new assembly, thereafter receiving only a low irradiation due to the neutron flux on the edge of the reactor core. In this way the mean irradiated level of fuel in the fuel element assembly may be substantially improved.

The invention will now be described with reference to the accompanying drawings in which FIG. 1 is an elevation partly sectioned and FIG. 2 is a sectional view on the line II—II of FIG. 1.

In the drawings nuclear fuel in the form of a series of clusters of seven fuel rods 101, one cluster above the other, is housed in a long sleeve made from an assembly of double-walled sleeves 102 stacked one upon another. The fuel rods 101 comprise uranium tubes 103 in protective stainless steel sheaths 104 with helical fins 105 and welded end caps 106. The end caps 106 carry plugs 107 which serve to support the fuel rods 101 in spiders 108 and locate them at their lower ends in spiders 109. The spiders 108 are attached to the sleeves 102 and the spiders 109 are a loose fit in the sleeves. Split pins 110 fix the fuel rods 101 in the spiders 108, 109.

The sleeves 102 have perforations 111 and are joined together by tubular pins 112 passing through and expanded into perforations 111 in adjacent sleeves 102. The top perforations 111 are blocked off by connecting pins 113 which connect the top sleeve 102 with a tube 114 having piston rings 115 to seal with an outer sleeve 120 and carrying a boss 116 on webs 117. The boss 116 has a central bore 118 with a recessed part 119 which can accommodate an expandible tool for lifting the fuel element assembly. The assembly is shown suspended in a thimble-shaped tube 121 so as to leave an annular space 122 between the sleeve 102 and the tube 121. The tube 121 is fitted in a fuel element channel in a nuclear reactor so as to provide a fuel element coolant channel.

In operation the fuel rods 101 are assembled in the sleeves 102 which are connected together by pins 112 passed through perforations 111 and the stack of sleeves is connected to the tube 114 by pins 113. The assembly is loaded into a fuel element channel in a nuclear reactor so as to leave the annular space 122 between the tube 121 fitted in the fuel element channel and the sleeves 102. Coolant sodium is fed into the annular space and flows down through the reactor, returning up the inside of the sleeves 102 between the fuel rods 101 as indicated by arrows 123. Some of the sodium also flows through the perforations 111 as indicated by arrows 124, for example, thereby reducing the pressure drop which would be experienced if all the sodium followed the complete path.

The fuel element assembly may at any time be removed from the reactor and dismantled by contracting and taking out the tubular pins 112 and the connecting pins 113. The stack may then be reassembled so that the portions previously in the top half of the reactor will be in the bottom half on reloading, the central portions being moved to the outside to even out the irradiation received overall.

We claim:
1. In combination with a thimble-shaped tubular member disposed in a vertical channel in the moderator of a nuclear reactor, a fuel element assembly suspended within the tubular member comprising a plurality of sleeves end-fitting one with the other to extend along the interior of the tubular member, nuclear fuel elements disposed within each sleeve, means supporting said fuel elements independently within each sleeve and removable pins connecting together said sleeves at the end-fitting regions thereof.
2. The combination of claim 1 wherein said sleeves are perforated to allow a fraction of reactor coolant flowing over the outer surfaces of the sleeves to pass through the walls thereof.

References Cited in the file of this patent
UNITED STATES PATENTS
2,831,807   McGarry _____ Apr. 22, 1958
2,936,273   Untermyer _____ May 10, 1960
FOREIGN PATENTS
216,588   Australia _____ Jan. 31, 1957
OTHER REFERENCES
International Conf. on Peaceful Uses of Atomic Energy, vol. 2, 1955, page 345.
Nuclear Power, February 1957, pp. 42–47.